(12) United States Patent
MacArthur et al.

(10) Patent No.: US 10,145,408 B2
(45) Date of Patent: Dec. 4, 2018

(54) LIFTING HOOK AND METHODS OF USING THE SAME

(71) Applicant: Honda Motor Co., Ltd., Tokyo (JP)

(72) Inventors: Benjamin MacArthur, Barrie (CA);
Jake Holloway, Mississauga (CA);
Kevin Faubert, Barrie (CA); Dwayne Switzer, Angus (CA)

(73) Assignee: Honda Motor Co., Ltd., Tokyo (JP)

( * ) Notice: Subject to any disclaimer, the term of this patent is extended or adjusted under 35 U.S.C. 154(b) by 29 days.

(21) Appl. No.: 15/365,341

(22) Filed: Nov. 30, 2016

(65) Prior Publication Data

US 2018/0149188 A1    May 31, 2018

(51) Int. Cl.
*F16B 45/04*    (2006.01)
*B65G 19/02*    (2006.01)

(52) U.S. Cl.
CPC ..................... *F16B 45/04* (2013.01)

(58) Field of Classification Search
CPC ........................................ F16B 45/04
USPC ........... 294/82.1, 82.13, 82.14, 82.11, 82.17, 294/82.23; 24/599.8, 598.8, 598.9, 600.8, 24/600.7; 59/93
See application file for complete search history.

(56) References Cited

U.S. PATENT DOCUMENTS

| | | | |
|---|---|---|---|
| 411,968 A | 10/1889 | Sanford | |
| 576,339 A * | 2/1897 | Clayton | |
| 1,159,777 A | 11/1915 | Heusser | |
| 1,751,905 A | 3/1930 | Button | |
| 1,836,169 A * | 12/1931 | Humphreys | E02F 3/60 59/93 |
| 2,371,009 A | 3/1945 | Wirkkala | |
| 2,583,320 A * | 1/1952 | Brummel | F16G 17/00 24/698.1 |
| 2,672,230 A | 3/1954 | Jetzke | |
| 3,194,598 A * | 7/1965 | Goldfuss | B64D 1/22 24/599.8 |
| 3,665,562 A | 5/1972 | Gower | |
| 3,883,170 A * | 5/1975 | Fricker | B66C 1/666 294/82.35 |
| 4,075,966 A * | 2/1978 | Bates | B63H 9/08 114/114 |
| 4,363,509 A * | 12/1982 | Schreyer | B60C 27/08 24/698.1 |
| 4,530,534 A * | 7/1985 | Fredriksson | F16G 15/04 294/74 |
| 5,026,594 A * | 6/1991 | Akao | B32B 27/322 428/220 |

(Continued)

FOREIGN PATENT DOCUMENTS

| | | |
|---|---|---|
| GB | 595198 A | 11/1947 |
| KR | 20150104369 A | 9/2015 |

*Primary Examiner* — Paul T Chin
(74) *Attorney, Agent, or Firm* — Armstrong Teasdale LLP

(57) ABSTRACT

A hook for lifting a component is described herein. The hook includes a coupling portion configured for coupling to a chain, and a base extending from the coupling portion. The base defines an opening sized to receive a first portion of the component therein, and includes an extension extending from a lower surface of the base. The extension at least partially defines a notch sized to receive a second portion of the component therein. The extension is oriented to engage the second portion of the component to facilitate maintaining the hook in an upright orientation.

20 Claims, 4 Drawing Sheets

(56) References Cited

U.S. PATENT DOCUMENTS

| | | | |
|---|---|---|---|
| 5,340,181 A * | 8/1994 | Matsuyama | B66C 1/36 294/82.2 |
| 5,829,810 A * | 11/1998 | Fredriksson | B66C 1/125 24/116 R |
| 6,308,383 B1 | 10/2001 | Schrader | |
| 8,100,449 B2 * | 1/2012 | Wray | B66C 1/36 24/600.8 |
| 8,313,131 B2 | 11/2012 | Hallett et al. | |
| 8,469,421 B2 | 6/2013 | Buie et al. | |
| D699,098 S * | 2/2014 | Fretz | D8/367 |
| D732,937 S | 6/2015 | Mcevilly | |
| 2013/0001967 A1 | 1/2013 | Root | |

* cited by examiner ary automotive assembly line.

LIFTING HOOK AND METHODS OF USING THE SAME

BACKGROUND

The present disclosure relates generally to transport systems for assembly lines, and, more specifically, to hooks for coupling components to transport systems to facilitate moving the components to different stations of an assembly line.

At least some production or assembly lines employ conveyors to transport components between different stations of the production line. Some known conveyors are mounted to a horizontal rail, and roll along that rail to move components between stations on the production line. At least some known conveyors include a chain that is coupled to the component via one or more hooks. In use, known hooks may undesirably move or rotate when there is no load on the chain (i.e., when there is slack in the chain). Consequently, because of the movement of the hooks, when a load is placed on the chain, the hook may support the component along a portion of the hook not designed to bear the full load of the component. As such, over time the hook may fail, the component may become damaged, or the chain may bind or become damaged.

BRIEF SUMMARY

In one aspect, a hook for lifting a component is provided. The hook includes a coupling portion configured for coupling to a chain, and a base extending from the coupling portion. The base defines an opening sized to receive a first portion of the component therein. The base includes an extension extending from a lower surface of the base, the extension at least partially defining a notch sized to receive a second portion of the component therein. The extension is oriented to engage the second portion of the component to facilitate maintaining the hook in an upright orientation.

In another aspect, a transport system for transporting a component along an assembly line is provided. The transport system includes a conveyor moveable between at least a first station and a second station of the assembly line, a chain coupled to the conveyor, and at least one hook coupled to the chain. The hook includes a coupling portion coupled to the chain, and a base extending from the coupling portion. The base defines an opening sized to receive a first portion of the component therein, and includes an extension extending from a lower surface of the base. The extension at least partially defines a notch sized to receive a second portion of the component therein, the extension oriented to engage the second portion of the component to facilitate maintaining the hook in an upright orientation.

In yet another aspect, a method of coupling a hook to a component including a first portion and a second portion cooperatively defining an opening in the component is provided. The method includes positioning a free end of the hook within the opening defined in the component such that the first portion of the component is received in an opening of the hook, the hook including an extension that extends from a lower surface of the hook. The method also includes rotating the hook relative to the component such that the extension engages the second portion of the component, the extension inhibiting further rotation of the hook relative to the component to facilitate maintaining the component in an upright orientation.

DETAILED DESCRIPTION

The present disclosure relates generally to transport systems for used with assembly lines, and, more specifically, to hooks for use in securely coupling components to transport systems to enable the components to be moved to different stations along an assembly line. As described in more detail below, at least some exemplary embodiments of the hook include an extension that maintains the hook in an upright orientation. The extension inhibits rotation of the hook in a "forward and backward" direction with respect to a bracket of an automotive component coupled to the hook and thus facilitates maintaining the hook in an upright orientation. Moreover, embodiments of the hook include additional features that further inhibit rotation of the hook in a "side-to-side" or lateral direction with respect to the component coupled to the hook and that facilitate preventing the hook from undesirably uncoupling from the component. Preventing rotation of the hook when the hook is coupled to the bracket prevents or inhibits the hook from supporting the component along portions of the hook not designed for load bearing.

Figure 1:
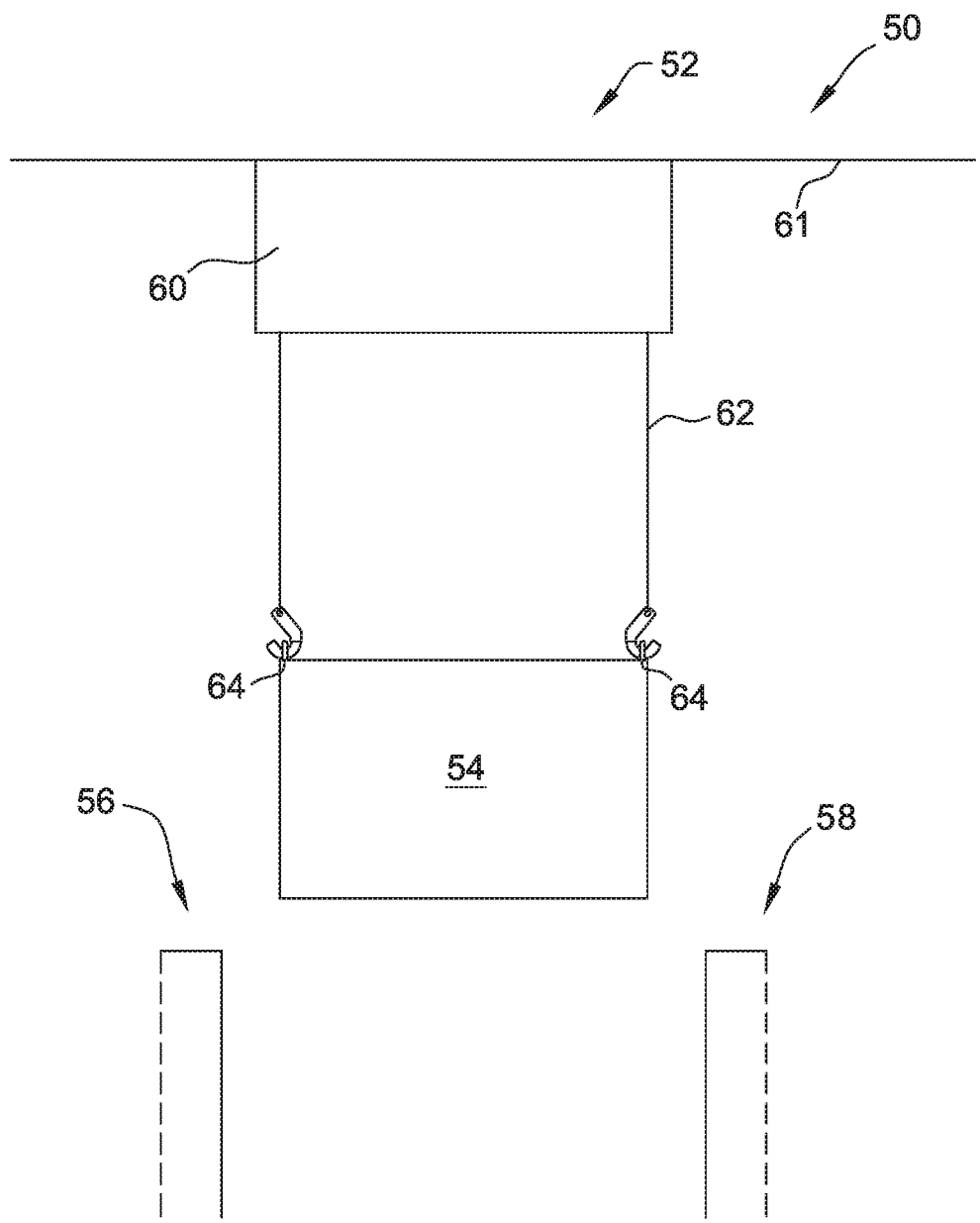
FIG. 1 is a schematic diagram of a portion of an exemplary automotive assembly line.

FIG. 1 is a schematic diagram of an exemplary automotive assembly line 50. In the exemplary embodiment, automotive assembly line 50 includes a transport system 52 that transports an automotive component 54 from a first station 56 to a second station 58. Automotive component 54 may be, for example and without limitation, an engine, a transmission, and/or an engine-transmission assembly. In the exemplary embodiment, transport system 52 includes a conveyor or carriage 60 rollably or slidably coupled along a rail 61, the conveyor 60 configured to travel between at least first station 56 and second station 58 along rail 61. Transport system 52 also includes a plurality of chains 62 coupled to conveyor 60 and hanging or extending downward therefrom. Each chain 62 is coupled to a respective hook 100, and each automotive component 54 includes a plurality of brackets 64 extending therefrom. In the exemplary embodiment, transport component 52 transports automotive component 54 by coupling hooks 100 to brackets 64. More specifically, chains 62 are suspended from conveyor 60 with sufficient slack to enable hooks 100 to be coupled to brackets 64. After hooks 100 are coupled to brackets 64, chains 62 are raised (e.g., conveyor 60 is raised or a length of chains 62 is reduced) such that automotive component 64 is suspended from conveyor 60 and can be transported to different stations of assembly line 50.

Figure 2:
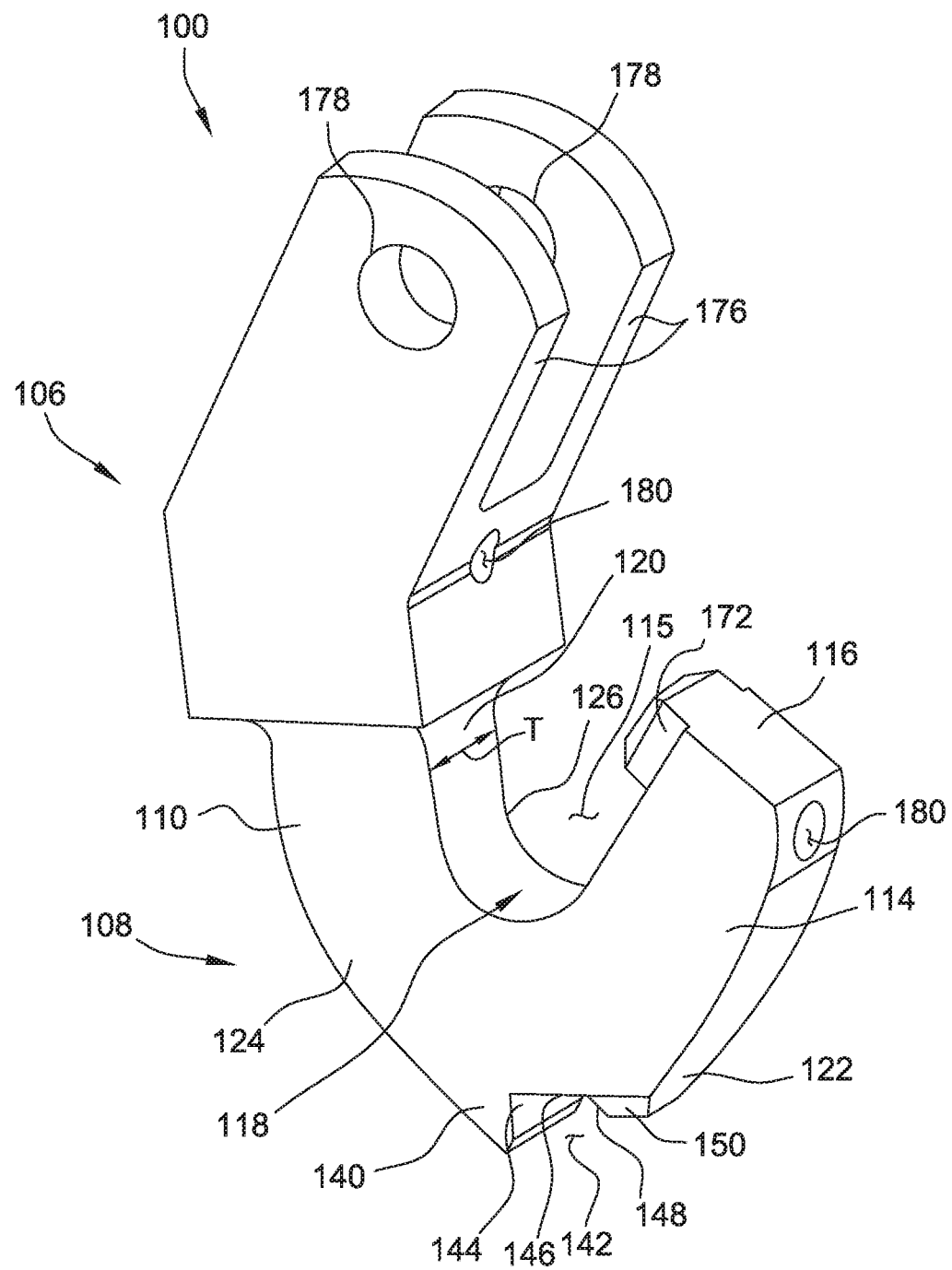
FIG. 2 is a perspective view of an exemplary hook that may be used with the automotive assembly line shown in FIG. 1.
Figure 3:
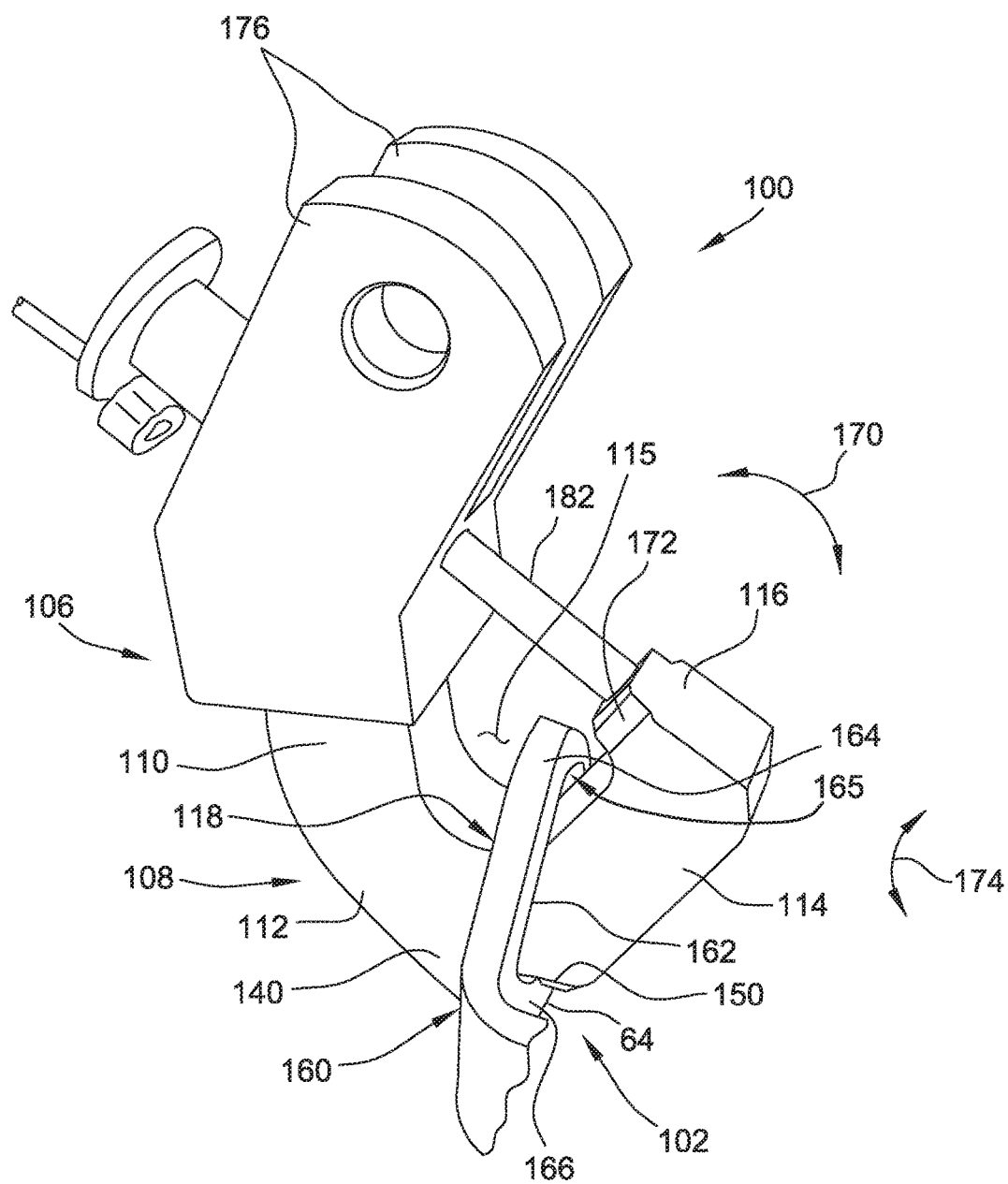
FIG. 3 is a perspective view of the hook shown in FIG. 2 in an upright orientation and coupled to a bracket of an automotive component on the automotive assembly line.
Figure 4:
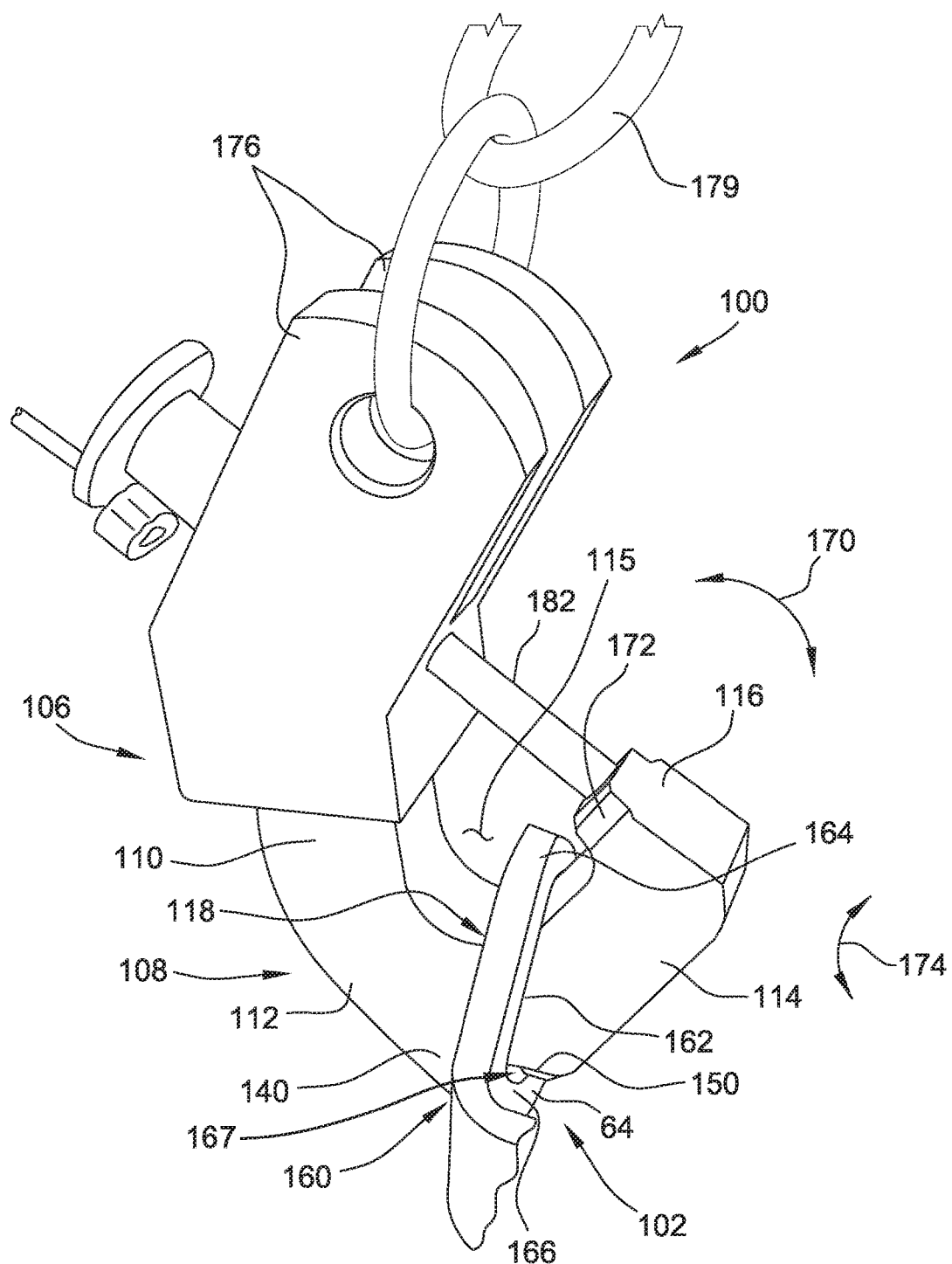
FIG. 4 is a perspective view of the hook shown in FIG. 2 in the upright orientation and lifting the automotive component.

FIG. 2 is a perspective view of an exemplary hook 100 that may be used with transport system 52 (shown in FIG. 1). FIG. 3 is another perspective view of hook 100 coupled to a bracket 64 of a component 102 (e.g., an automotive component, such as automotive component 54). FIG. 4 is a perspective view of hook 100 coupled to bracket 64 and lifting component 102. In one embodiment, component 102 is a transmission, and hook 100 is configured to move the transmission between stations of automotive assembly line 50 (shown in FIG. 1). In the exemplary embodiment, hook 100 includes a coupling portion 106 that is coupled to a chain (e.g., chain 62) and a hook portion or base 108 that extends from coupling portion 106 and that receives bracket 64. In the exemplary embodiment, coupling portion 106 and base 108 are integrally formed as a single piece. In other embodiments, coupling portion 106 and base 108 may be independently formed and coupled together to form hook 100.

In the exemplary embodiment, base 108 is substantially U-shaped. More specifically, base 108 includes a first leg 110 that extends from coupling portion 106, a body 112 that extends from first leg 110, and a second leg 114 that extends from body 112 to a free end 116. First leg 110, body 112, and second leg 114 define an opening 115 and form a U-shape of base 108. A seat 118 is defined along an upper surface 120 of base 108. Seat 118 at least partially defines a bottom of opening 115. In addition, base 108 includes a lower surface 122. Upper and lower surfaces 120 and 122 each extend across first leg 110, body 112, and second leg 114. Moreover, each surface 120 and 122 also extends across a first side wall 124 and a second side wall 126 of base 108.

In the exemplary embodiment, hook 100 includes an extension 140 that extends from lower surface 122. Extension 140 is oriented to at least partially define a notch 142 in lower surface 122 of base 108, generally opposite seat 118. Extension 140 includes a first surface or wall 144 that at least partially defines notch 142. Base 108 includes a second surface or wall 146 adjoining first surface 144 that is oriented to further define notch 142. Second surface 146 is oriented at an angle, with respect to first surface 144, that enables second surface 146 and/or first surface 144 to substantially conform to the particular bracket 64 being coupled to hook 100 to facilitate maintaining hook 100 in an upright orientation. In the exemplary embodiment, second surface 146 is oriented at an angle of about 90° with respect to first surface 144. In alternative embodiments, second surface 146 may be oriented at any other angle with respect to first surface 144 that enables hook 100, specifically extension 140 and/or notch 142, to function as described herein.

In the exemplary embodiment, base 108 also includes a lip 150 that extends from lower surface 122 of base 108 (more specifically, from lower surface 122 of second leg 114). Lip 150 includes a third surface or wall 148 that further defines notch 142. Third surface 148 adjoins and extends from second surface 146, and is positioned on an opposite side of notch 142 from first surface 144. Third surface 148 is oriented at an oblique angle with respect to second surface 146. The orientation of third surface 148 facilitates coupling of hook 100 to bracket 64 and maintaining hook 100 in an upright orientation when hook 100 is coupled to bracket 64. In the illustrated embodiment, third surface 148 is oriented at an angle greater than 90° with respect to second surface 146.

Bracket 64 includes an arm 160 that defines an opening 162 therein. More particularly, arm 160 includes a first or upper portion 164 and a second or lower portion 166 that cooperatively define opening 162. To couple hook 100 to bracket 64, second leg 114 of hook 100 is maneuvered through opening 162. First portion 164 of bracket 64 is received in hook opening 115. In addition, bracket second portion 166 is received in notch 142, and engages extension 140 and/or lip 150. When hook 100 is not lifting component 102 (i.e., in the absence of an applied lifting force), as illustrated in FIG. 3, bracket second portion 166 is retained in notch 142 such that a gap 165 exists between seat 118 and bracket first portion 164. Extension first surface 144 engages second portion 166 of bracket 64 to maintain hook 100 in an upright orientation (as shown in FIG. 3). In particular, extension 140 engages second portion 166 of bracket 64 to prevent rotation of hook 100 in a "forward" or "backward" direction 170 (i.e., about an axis that extends parallel to a thickness T (FIG. 2) of hook 100). In addition, lip third surface 148 further prevents or inhibits rotation of hook 100 in direction 170 and as such facilitates maintaining hook 100 in an upright orientation. Thus, as compared to other lifting hooks, notch 142 facilitates maintaining hook 100 in the upright orientation (shown in FIG. 3), even in the absence of a lifting force on hook 100. When a lifting force is applied to hook 100 (e.g., via a chain), hook 100 moves upward relative to bracket 62 until seat 118 engages bracket first portion 164, as illustrated in FIG. 4, such that a gap 167 is formed between hook second surface 146 (FIG. 2) and bracket second portion 166. Seat 118 is designed to bear the full load of component 102 or, when more than one hook 100 is used to transport component 102, at least a portion of the full load of component 102.

Base 108 also includes an extension or "barb" 172 that extends from free end 116 of second leg 114 towards first leg 110. Barb 172 prevents component 102 from undesirably or inadvertently uncoupling from hook 100, for example, in an event that hook 100 temporarily transitions into a non-upright orientation (e.g., first portion 164 of bracket 64 is unseated from seat 118 and/or second portion 166 is dislodged from notch 142). Accordingly, barb 172 facilitates retaining bracket first portion 164 within hook opening 115. In addition, in the exemplary embodiment, free end 116 of second leg 114 has a substantially rectangular cross-section. In alternative embodiments, free end 116 has a cross-section with any other regular or irregular shape (e.g., circular, elliptical). As compared to at least some known hooks that have a free end that tapers to a point, the comparatively expanded cross-sectional profile of free end 116 facilitates reducing the likelihood that bracket 64 will inadvertently uncouple from hook 100.

In addition, hook 100 has a thickness T (FIG. 2) extending from first side wall 124 to second side wall 126 of hook 100. Hook thickness T is thicker as compared to at least some known lifting hooks. More particularly, thickness T of hook 100 is variably selected based upon which bracket 64 is being coupled to hook 100. For example, in the exemplary embodiment, hook thickness T is only slightly narrower than a width or diameter (not shown) of opening 162 of bracket 64. Accordingly, hook thickness T facilitates maintaining hook 100 in the upright orientation, as rotation in a "side to side" or lateral direction 174 (i.e., rotation about an axis defined through a center of bracket opening 162) is inhibited. Moreover, the increased thickness T at base 108 and, specifically, along lower surface 122 of base 108, as compared to at least some known lifting hooks, facilitates improving the stability of hook 100 in the upright orientation, particularly in the absence of a lifting force on hook 100 (shown in FIG. 3).

In the exemplary embodiment, the shape, size, and orientation of the features of hook 100—such as hook thickness T, the orientation of surfaces 144, 146, 146 that define notch 142, and the size and orientation of extension 140—are specifically designed to correspond to and cooperatively interact with the particular shape, size, and orientation of features of bracket 64. However, variations from the specific embodiment illustrated are contemplated, for use with alternative brackets and/or for lifting alternative components.

In the exemplary embodiment, hook coupling portion 106 includes a pair of arms 176 that are spaced from one another to form a U-shaped coupling portion 106. Moreover, in the exemplary embodiment, each arm 176 of coupling portion 106 includes a chain opening 178 defined therein. Chain openings 178 are sized and configured to receive one or more chain links 179 (e.g., of chains 62 shown in FIG. 1, and/or rope, thread, or cable). Hook 100 is coupled to chain links 179 such that hook 100 may be moved, for example, through assembly line 50 (also shown in FIG. 1) to transport component 102 between assembly line stations.

Additionally, both coupling portion 106 and second leg 114 of base 108 include a channel 180 defined therethrough. A pin 182 (e.g., a quick-release pin) is coupled to hook 100 at coupling portion 106 and second leg 114 through channel 180. Pin 182 extends across opening 115 and, as such, inhibits uncoupling of hook 100 from bracket 64, for example, when there is slack in chain 62 holding hook 100.

Embodiments of the hooks described herein facilitate maintaining a hook in an upright position, and preventing or inhibiting rotation of a hook relative to a bracket coupled to the hook. Specifically, the hooks include an extension oriented to engage with at least a portion of the bracket to facilitate maintaining the hook in an upright position. Moreover, the hooks of the present disclosure facilitate improving retention of the bracket within a seat of the hook that is designed to bear a load of the component being lifted. Embodiments of the hook also include features that facilitate preventing the hook from undesirably uncoupling from the component.

Exemplary embodiments of hooks and methods of using the same are described herein. The systems and methods described herein are not limited to the specific embodiments described herein, but rather, components of the systems and/or steps of the methods may be utilized independently and separately from other components and/or steps described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hook for lifting a component, said hook comprising: a coupling portion configured for coupling to a chain; and a base extending from said coupling portion, said base defining an opening sized to receive a first portion of the component therein, said base comprises an extension extending from a bottom of said base, said extension at least partially defines a notch sized to receive a second portion of the component therein, wherein said extension comprises a first surface, said base comprises a second surface adjoining said first surface, wherein said first and second surfaces at least partially define said notch, wherein said first surface adjoins a lower surface of said base to define a free end of said extension, said first surface of said extension is oriented to engage the second portion of the component to facilitate maintaining said hook in an upright orientation.

2. The hook of claim 1, wherein said second surface is oriented at an angle of about 90° with respect to said first surface.

3. The hook of claim 1, wherein said base further comprises a lip extending from said base bottom, said lip further defines said notch, said lip is oriented to engage the second portion of the component to facilitate maintaining said hook in an upright orientation.

4. The hook of claim 3, wherein said lip comprises a third surface, said second surface adjoining said third surface, said second and third surfaces at least partially define said notch.

5. The hook of claim 4, wherein said second surface is oriented at an angle greater than 90° with respect to said third surface.

6. The hook of claim 4, wherein said third surface extends from said second surface opposite said first surface.

7. The hook of claim 1, wherein said base further comprises a first leg extending from said coupling portion, a body extending from said first leg, and a second leg extending from said body opposite said first leg, such that said base is substantially U-shaped.

8. The hook of claim 7, wherein said second leg comprises a barb extending from a free end of said second leg towards said first leg.

9. The hook of claim 7, wherein said body defines a seat of said U-shaped based, wherein said notch is located on said base directly opposite said seat.

10. The hook of claim 1, further comprising a pin extending across the opening defined by said base and coupled to said coupling portion and to said base.

11. The hook of claim 1, wherein said first surface maintains engagement with the second portion of the component in the absence of a lifting force applied to said hook.

12. A transport system for transporting a component along an assembly line, said transport system comprising:
a conveyor moveable between at least a first station and a second station of the assembly line;
a chain coupled to said conveyor; and
at least one hook coupled to said chain, said hook comprising:
a coupling portion coupled to said chain; and
a base extending from said coupling portion, said base defining an opening sized to receive a first portion of the component therein, and comprising an extension extending from a bottom of said base, said extension at least partially defines a notch sized to receive a second portion of the component therein, wherein said extension comprises a first surface, said base comprises a second surface adjoining said first surface, wherein said first and second surfaces at least partially define said notch, wherein said first surface adjoins a lower surface of said base to define a free end of said extension, said first surface of said extension is oriented to engage the second portion of the component to facilitate maintaining said hook in an upright orientation.

13. The transport system of claim 12, wherein said second surface is oriented at an angle of about 90° with respect to said first surface.

14. The transport system of claim 12, wherein said base further comprises a lip extending from said base bottom, said lip further defines said notch, said lip is oriented to engage the second portion of the component to facilitate maintaining said hook in an upright orientation.

15. The transport system of claim 14, wherein said lip comprises a third surface, said second and third surfaces at least partially define said notch.

16. The transport system of claim 15, wherein said second surface is oriented at an angle greater than 90° with respect to said third surface.

17. The transport system of claim 15, wherein said a third surface adjoins and extends from said second surface opposite said first surface.

18. The transport system of claim 12, wherein said hook further comprises a pin extending across the opening defined by said base and coupled to said coupling portion and to said base.

19. A method of coupling a hook to a component including a first portion and a second portion cooperatively defining an opening in the component, said method comprising:
   positioning a free end of the hook within the opening defined in the component such that the first portion of the component is received in an opening of the hook, the hook including an extension that extends from a bottom of the hook; and
   rotating the hook relative to the component such that the extension engages the second portion of the component, the extension inhibiting further rotation of the hook relative to the component to facilitate maintaining the hook in an upright orientation.

20. The method of claim 19, further comprising coupling a pin to the hook such that the pin extends across the opening of the hook to inhibit de-coupling of the hook from the component.

\* \* \* \* \*